US008803393B2

(12) United States Patent
Atkinson et al.

(10) Patent No.: US 8,803,393 B2
(45) Date of Patent: Aug. 12, 2014

(54) MULTI-PHASE STATOR DEVICE

(71) Applicant: Hoganas AB (Publ), Hoganas (SE)

(72) Inventors: Glynn James Atkinson, Tynemouth (GB); Alan G Jack, Hexham Northumberland (GB); Barrie Mecrow, Whitley Bay Tyne and Wear (GB)

(73) Assignee: Hoganas AB (Publ), Hoganas (SE)

( * ) Notice: Subject to any disclaimer, the term of this patent is extended or adjusted under 35 U.S.C. 154(b) by 0 days.

(21) Appl. No.: 13/861,780

(22) Filed: Apr. 12, 2013

(65) Prior Publication Data

US 2013/0264893 A1    Oct. 10, 2013

Related U.S. Application Data

(63) Continuation of application No. 13/496,891, filed as application No. PCT/EP2010/063796 on Sep. 20, 2010, now Pat. No. 8,441,162.

(60) Provisional application No. 61/244,281, filed on Sep. 21, 2009.

(30) Foreign Application Priority Data

Sep. 21, 2009   (DK) ................................. 2009 70119

(51) Int. Cl.
*H02K 21/12*   (2006.01)
(52) U.S. Cl.
USPC .................................................... 310/156.02
(58) Field of Classification Search
USPC ..................... 310/156.02, 156.48, 216.033
See application file for complete search history.

(56) References Cited

U.S. PATENT DOCUMENTS 6,348,265 B1    2/2002  Jansson et al.
7,466,057 B2   12/2008  Imai
7,538,469 B2 *  5/2009  Thornton et al. .......... 310/12.18
7,638,919 B2   12/2009  Pulnikov et al.
(Continued)

FOREIGN PATENT DOCUMENTS

DE           10050352 C1    1/2002
EP            1005136 A1    5/2000
(Continued)

OTHER PUBLICATIONS

Machine Translation for EP 1005136 Oct. 9, 2013.*

(Continued)

*Primary Examiner* — Hanh Nguyen
(74) *Attorney, Agent, or Firm* — Buchanan Ingersoll & Rooney P.C.

(57) ABSTRACT

Disclosed is a stator device adapted to be arranged in an electrical machine, where the electrical machine further includes a moving device, where the stator device is a multi-phase stator device, where the phases are arranged side-by-side in a direction perpendicular to direction of motion of the moving device, and where each phase comprises a first stator core section having a set of teeth, a second stator core section having a set of teeth, and a coil, and where the teeth are arranged to protrude towards the moving device; and wherein at least two neighboring phases share a stator core section, so that the first stator core section of a first phase and a second stator core section of a second phase is formed as a single unit.

32 Claims, 10 Drawing Sheets

(56) References Cited

U.S. PATENT DOCUMENTS

| | | |
|---|---|---|
| 7,830,057 B2 | 11/2010 | Gieras |
| 7,952,252 B2 * | 5/2011 | Kang et al. ............. 310/216.015 |
| 8,378,545 B2 | 2/2013 | Jack |

FOREIGN PATENT DOCUMENTS

| | | |
|---|---|---|
| EP | 1667310 A1 | 6/2006 |
| WO | 2007024184 A1 | 3/2007 |
| WO | 2007043161 A1 | 4/2007 |

OTHER PUBLICATIONS

International Search Report (PCT/ISA/2100 issued Nov. 17, 2010 by European Patent Office as the International Searching Authority for International Application No. PCT/P2010/063796.

Written Opinion (PCT/ISA/237) issued Nov. 17, 2010 by European Patent Office as the International Searching Authority for International Application No. PCT/P2010/063796.

* cited by examiner

MULTI-PHASE STATOR DEVICE

CROSS REFERENCE TO RELATED APPLICATIONS

The present application is a continuation of U.S. application Ser. No. 13/496,891, filed on Apr. 18, 2012, which is a national stage application of International Application No. PCT/EP2010/063796, filed on Sep. 20, 2010, which claims the benefit of U.S. Provisional Application No. 61/244,281, filed on Sep. 21, 2009, and claims the benefit of Danish Application No. PA 2009 70119, filed on Sep. 21, 2009. The entire contents of each of U.S. application Ser. No. 13/496,891, International Application No. PCT/EP2010/063796, U.S. Provisional Application No. 61/244,281, and Danish Application No. PA 2009 70119 are hereby incorporated herein by reference in their entirety.

FIELD OF THE INVENTION

This invention generally relates to electric machines. More particularly, the invention relates to a rotating or linearly moving three-phase transverse flux machine with a permanent magnet rotor or mover structure. This type of machine could be utilized either as a motor or a generator depending on the area of application. A linearly moving machine may also be denoted a linear machine, a transversally moving machine or a translational moving machine.

BACKGROUND OF THE INVENTION

The transverse flux machine (TFM) topology is an example of a modulated pole machine. It is known to have a number of advantages over conventional machines. The basic design of a single-sided radial flux stator is characterized by a single, simple phase winding parallel to the air gap and with a more or less U-shaped yoke section surrounding the winding and exposing in principal two parallel rows of teeth's facing the air gap. The state-of-art multi-phase arrangement is characterized by stacking magnetically separated single phase units perpendicular to the direction of motion of the rotor or mover. The phases are then electrically and magnetically shifted by 120 degrees for a three-phase arrangement to smooth the operation and produce a more or less even force or torque independent of the position of the rotor or mover. Note here that the angle referred to is given in electrical degrees which is equivalent to mechanical degrees divided by the number of pairs of magnetic poles.

A cylindrical motor uses a concentric stator and rotor, and the motion is then considered as rotational or as an end-less rotation. A linear machine uses translation motion that is normally not a closed motion pattern but may be a back-and-forward motion along a 'line'. The linear machine or driver has a mover instead of a rotor. The magnetic circuit may be arranged by the same basic magnetic principles in both a rotor and mover, however the geometries will differ.

An example of an efficient rotor or mover arrangement is the use of so called buried magnets combined with soft magnetic pole sections or pieces to allow the permanent magnet field to flux-concentrate or be flexible in a direction transverse to the motion as e.g. described in the patent application WO2007/024184 by Jack et al.

WO2007/024184 discloses an electrical, rotary machine, which includes a first stator core section being substantially circular and including a plurality of teeth, a second stator core section being substantially circular and including a plurality of teeth, a coil arranged between the first and second circular stator core sections, and a rotor including a plurality of permanent magnets. The first stator core section, the second stator core section, the coil and the rotor are encircling a common geometric axis, and the plurality of teeth of the first stator core section and the second stator core section are arranged to protrude towards the rotor. Additionally the teeth of the second stator core section are circumferentially displaced in relation to the teeth of the first stator core section, and the permanent magnets in the rotor are separated in the circumferential direction from each other by axially extending pole sections made from soft magnetic material.

The stacking of the individual stator phase sections is normally based on a physical magnetic separation in-between the individual phase-sections to reduce the magnetic coupling in-between the phases that possibly can have an effect of reducing the effective flux in the air gap during operation.

It is desirable in some applications to provide a machine that is as geometrically compact as possible to fit in a given limited space and to be able to have a high volume specific performance e.g. expressed as Torque per Volume $[Nm/m^3]$.

A conventional, balanced 120 degree phase shift, three-phase sinusoidal or trapezoidal drive scheme does not fully engage the core magnetically during the time cycling of operation, and therefore a significant part of the total stator core volume is constantly inefficiently used.

Thus prior art discloses tuning of a set of three phase units at phase orders 0°, 120°, and 240°.

It remains a problem to optimize performance numbers or values, such as torque pr. volume and/or torque pr. current.

EP 1005136 discloses a transverse flux machine having combined phases. However, it remains desirable to provide a simpler construction of such an electrical machine.

SUMMARY

Disclosed is an electrical machine comprising a stator device and a moving device, wherein the stator device is a multi-phase stator device comprising a plurality of phases arranged side-by-side in a lateral direction, perpendicular to a direction of motion of the moving device, where the stator device comprises a plurality of sets of teeth, each tooth protruding towards the moving device and comprising an interface surface facing the moving device, wherein the teeth of each set are distributed along the direction of motion, wherein the plurality of sets of teeth comprises two peripheral sets and a plurality of inner sets arranged in the lateral direction between the peripheral sets; where the teeth of the inner sets are wider, in the lateral direction, than the teeth of the peripheral sets and provide a common magnetic flux path shared by two neighboring phases.

In embodiments of the electrical machine, the moving device comprises a plurality of permanent magnets separated from each other in said direction of motion by pole sections formed as rectilinear rods elongated in the lateral direction, and the pole sections extend laterally across all phases of the stator. In particular, the interface surfaces of the teeth of the peripheral sets may define a lateral extent, measured in the lateral direction, of an active air gap region between the stator device and the moving device; and the rods may provide a magnetic flux path extending across the lateral extent of the active air gap.

In embodiments of the electrical machine, the teeth of the respective sets are arranged displaced in the direction of motion relative to the teeth of the other sets.

Each phase of the stator device may be formed by two stator core sections wherein the teeth of a first stator core section of a first one of two neighboring phases and the corresponding teeth of a second stator core section of a second one of the two neighboring phases are formed as a common set of teeth providing a common magnetic flux path shared by both neighboring phases.

Hence, teeth of neighboring phases magnetically function as a common set of teeth that are common to the two neighboring/adjacent phases, and that are magnetically shared by the two neighboring/adjacent phases. The moving device and the stator device each have a simple construction involving few parts. The parts of the moving device each have a simple geometric shape, thus allowing efficient and cost-effective construction.

The teeth of the first stator core section of the first one of two neighboring phases may be located at the same positions (along the direction perpendicular to the direction of motion of the moving device) as the corresponding teeth of the second stator core section of the second one of the two neighboring phases, i.e. the teeth of the adjacent stator core sections of the neighboring phases may be aligned with each other in the direction perpendicular to the direction of motion of the moving device. The first stator core section of a first phase and a second stator core section of a second phase may be formed as two separate units arranged back-to-back, e.g. abutting each other, or they may be formed as a single unit, thus forming a common stator core section common to the neighboring phases.

Consequently, it is an advantage that the phases are combined to magnetically share a stator core section during operation, since this provides that a significant part of the total stator core volume is constantly efficiently used.

It is an advantage that the duty cycle of magnetization is improved, since flux paths are shared between the neighboring phases.

It is an advantage that the stator device may function as a single sided transverse flux machine, since hereby the volume and weight specific performance is improved. Thus the performance numbers for e.g. torque pr. volume and/or torque pr. current may be improved.

It is an advantage that the geometrical width of the machine in a direction perpendicular to the direction of motion may be reduced, since a magnetic separation section in-between the phases results in a larger geometrical width.

Furthermore, it is an advantage that an electrical, rotary machine may comprise permanent magnets with axially shorter total length than in a conventional stator device with separated phases. It is a further advantage that the axially shorter permanent magnets will result in lower cost.

When the common stator section of neighboring phases is formed as a single unit, a reduced number of components is required for the stator device, since a stator core section is shared between two or more phases. In prior art stator devices, each phase has its own separate set of stator core sections.

Furthermore, it is an advantage that there is a higher level of integration of the components, since hereby the stator device may be more robust and may be easier to manufacture.

A set of teeth is defined as a group of teeth, such as a plurality of teeth.

Since the phases are arranged side-by-side in a direction perpendicular to the direction of motion of the moving device, the direction will be axial in a rotary machine.

A moving device may be a rotor in a rotationally moving device or a mover in a linearly moving device.

In some embodiments the stator core section is a soft magnetic structure. It is an advantage that the improved utilization of soft magnetic structure causes improved performance per volume. In one embodiment the stator core sections are made of soft magnetic powder. By making the stator core sections from soft magnetic powder the manufacturing of the stator device may be simplified and magnetic flux concentration, utilizing the advantage of effective three dimensional flux paths, may be more efficient.

Each stator core section may comprise a stator core back section and a set of teeth extending from the stator core section, wherein the stator core back section connects the teeth and provides a flux path between neighboring teeth in the direction of motion. A stator core section may further comprise a yoke section that provides a flux path in the lateral direction towards another stator core section comprising another one of the sets of teeth of the same phase.

In some embodiments, the stator device comprises a single yoke section connecting the stator cores sections of all phases. In a rotary machine, the flux bridge may be a stator yoke section arranged concentrically with the first and second stator core sections. By arranging such a stator core section the manufacturing process of the parts of the stator assembly and the assembling process of the stator assembly may be facilitated and more cost-effective.

The stator core section may thus be manufactured so as to only comprise a small number of parts, and allow each tooth of one set of teeth to magnetically communicate with more than one teeth of another one of the sets of teeth of the same phase.

In some embodiments the stator device is a three-phase stator. An odd number of phases is advantageous, because the instantaneous sum of the currents is zero that means that the number of supply wires to the machine is reduced by one, and the number of switching devices required in the converter is reduced by two. The minimum number of multiple and odd numbered phases is therefore three. Other odd numbers of phases, such as five, seven, nine etc. phases may also be provided. Hence, generally, a multiphase stator device may comprise n phases (n being an integer and n>1), including two peripheral phases each having a single neighboring phase and n−2 inner phases, each inner phase having two neighboring phases, wherein each inner phase comprises two common sets of teeth, each common set of teeth being common/shared with one of the respective neighboring phases of the inner phase, wherein each peripheral phase comprises a set of peripheral teeth and a set of common teeth common/shared with the respective neighboring phase of the peripheral phase, Furthermore, an even number of phases may also be provided, but may not be as advantageous as an odd number of phases, as described above.

In some embodiments the electric machine is a rotary machine. The moving device is a rotor. In this case, the first stator core section, the second stator core section, the coil and the rotor may encircle a common geometric axis. In a rotary machine the lateral direct is an axial direction of the machine, and the direction of motion is a circumferential direction of the machine.

The permanent magnets in the moving device may be separated in the direction of motion from each other by laterally extending pole sections in the form of rectilinear rods. The pole sections may be made of a soft magnetic powder. The permanent magnets may be magnetized in the direction of motion and with alternating orientation. Generally, the permanent magnets may also be rectilinear rods elongated in the lateral direction; the rods may extend across the lateral extent of the active air gap In some embodiments the electrical machine is a modulated pole machine such as a transversal flux machine.

In conventional machines, the coils explicitly form the multi-pole structure of the magnetic field, and the magnetic core function is just to carry this multi-pole field to link the magnet and/or other coils.

In a modulated pole machine, it is the magnetic circuit which forms the multi-pole magnetic field from a much lower, usually two, pole field produced by the coil. In a modulated pole machine, the magnets usually form the matching multi-pole field explicitly but it is possible to have the magnetic circuit forming multi-pole fields from a single magnet.

The modulated pole machine has a three-dimensional (3D) flux path utilizing magnetic flux paths in the transverse direction both in the stator and in the moving device, e.g. in the axial direction in a rotating machine, where the moving device is a rotor. The 3-dimensional flux paths are particularly suitable when utilizing the combined phases stator.

Thus in some embodiments the stator device and/or the moving device comprise a three-dimensional (3D) flux path including a flux path component in the transverse direction relative to the direction of movement.

The benefit of having the modulation is that every pole sees all of the magneto motive force (MMF) of the coil, so that as the pole number rises, the magnetic field strength (MMF/meter) rises with it without any change in the coil. This may be compared with a conventional machine in which as the pole number rises, so does the number of coils and hence the smaller each coil is. The pole pitch however also falls with pole number, so that as the pole number rises, the magnetic field strength is more or less constant in a conventional machine as the MMF/coil reduction balances with the reduction in pole pitch.

The natural design for a modulated pole machine is for a high pole number. This may make very high electric loading, i.e. magnetic field strength, possible with modest requirements for the volume of the conductor required.

Thus a modulated pole machine will show its largest advantage in circumstances where the pole number is high and the possible electric loading using conventional coils is low.

In some embodiments the modulated pole machine comprises a claw pole arrangement or extension.

For modulated pole machines, taking as fixed a geometry which forms torque from a circumferential/axial surface i.e. a radial field machine, the field may be carried radially across the air gap with the magnetic circuit, circumferentially by one pole pitch, which can be done in the stator or the rotor or partially in both, and axially in both directions to enclose the coil. If the axial circuit is closed in the stator around the coil, the claw pole arrangement is produced.

A claw pole arrangement or extension may be used together with the combined phases, but the axial claw extension should be limited or small in order not to cause leakage. Leakage may occur when the claws overlap each other, since these overlapping faces may provide an unwanted path for leakage flux. Even if claws only stretch to half the phase axial width, they may come in close proximity and that may cause a lot of unwanted magnetic leakage, so only small or minor claws should be used when using combined phases. Thus it is possible to use minor claws, defined as semi-claw poles, to adjust the pole tip area but the claws may not be able to overlap axially since the phase shift of the combined phases hinders the free extension of claws across the stators axial extension.

The present invention relates to different aspects including the stator device described above and in the following, and corresponding methods, devices, and/or product means, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced.

FIGS. 1a-4 show examples of a three-phase machine with separate phases, which may be termed a Separate Phase Modulated Pole Machine (SPMPM).

Figure 1A:
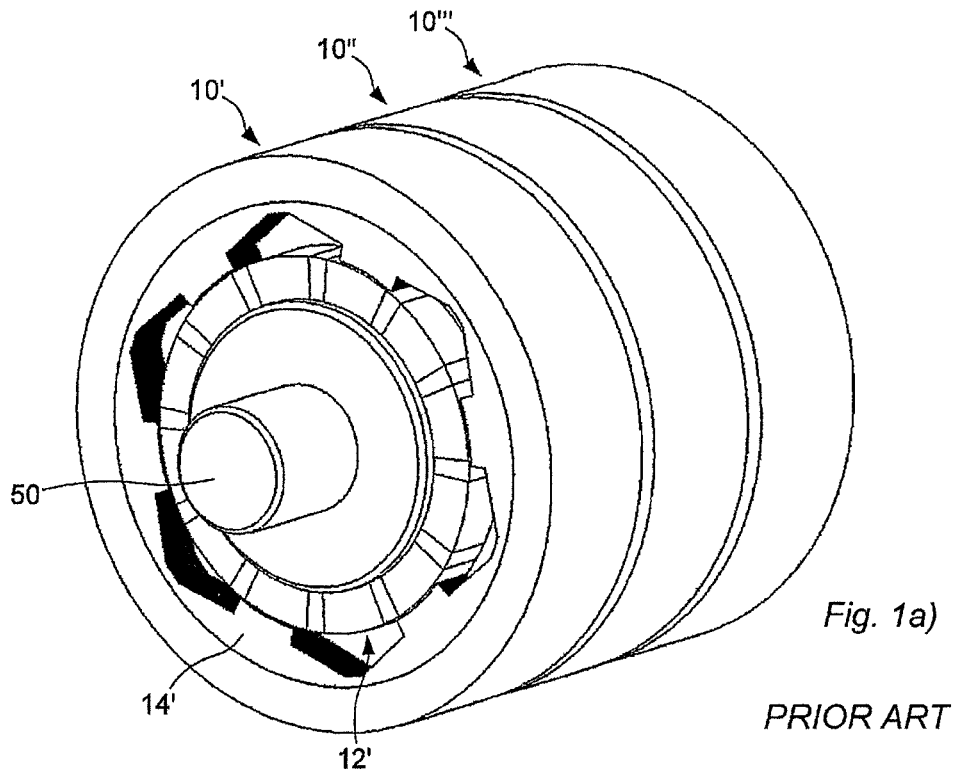
FIGS. 1a-1d show examples of a prior art machine and stator device with separated phases.

FIGS. 1a)-1b) show an example of a prior art three-phase radial machine. An electrical, rotary machine comprises a stator assembly and a rotor. For the purpose of the present description, primed reference numerals with ' generally refer to a feature of a first phase, " to a corresponding feature of a second phase and '" to a corresponding feature of a third phase, while reference numerals without prime refer to the corresponding features of all phases. Three stator assemblies 10', 10", 10'" are shown, and each stator assembly comprises a first stator core section 14, a second stator core section 16, a stator yoke section 18 and a coil 20. Three rotors 12', 12", 12'" are shown, and each rotor 12 comprises permanent magnets 22 and pole sections 24. An axle 50 onto which the rotor is mounted is shown. Each stator core section 14, 16 is essentially circular in shape and includes a plurality of radially extending teeth 26. The teeth are arranged to extend towards the rotor 12 for forming a closed circuit flux path with the rotor 12.

Each of the phase sections, i.e. single phase machines, is shown including a rotor of its own, i.e. each phase section corresponds completely to a single phase machine.

Figure 1B:
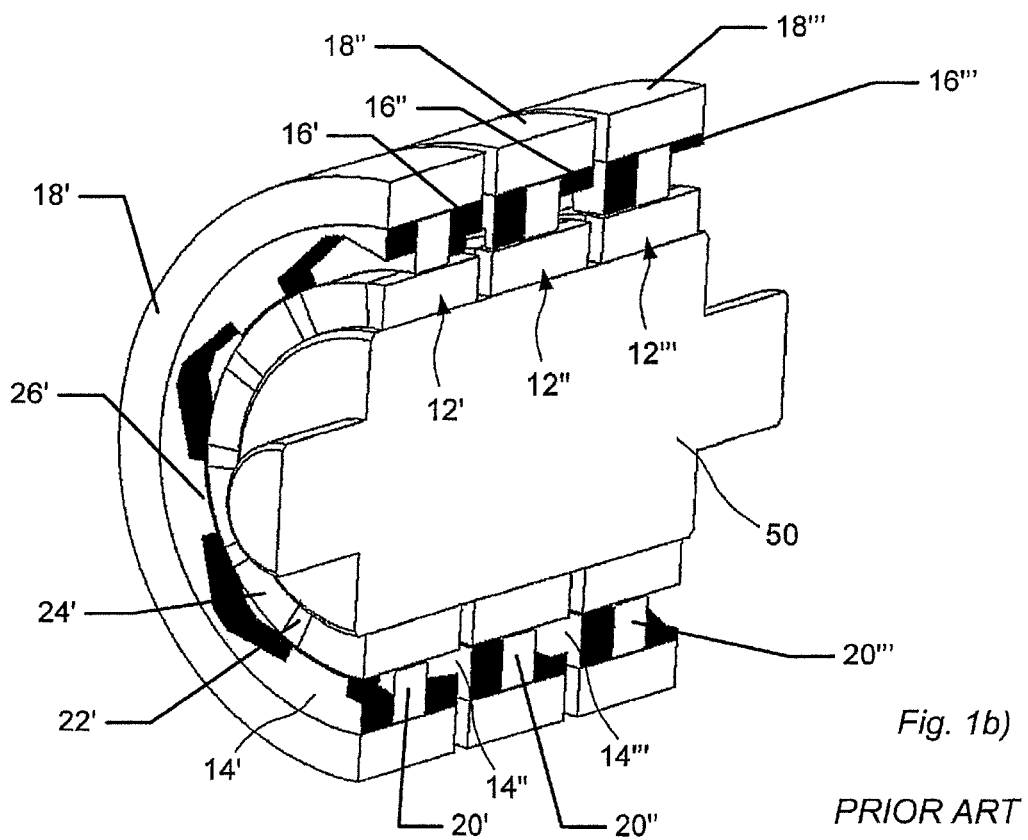
Figure 1C:
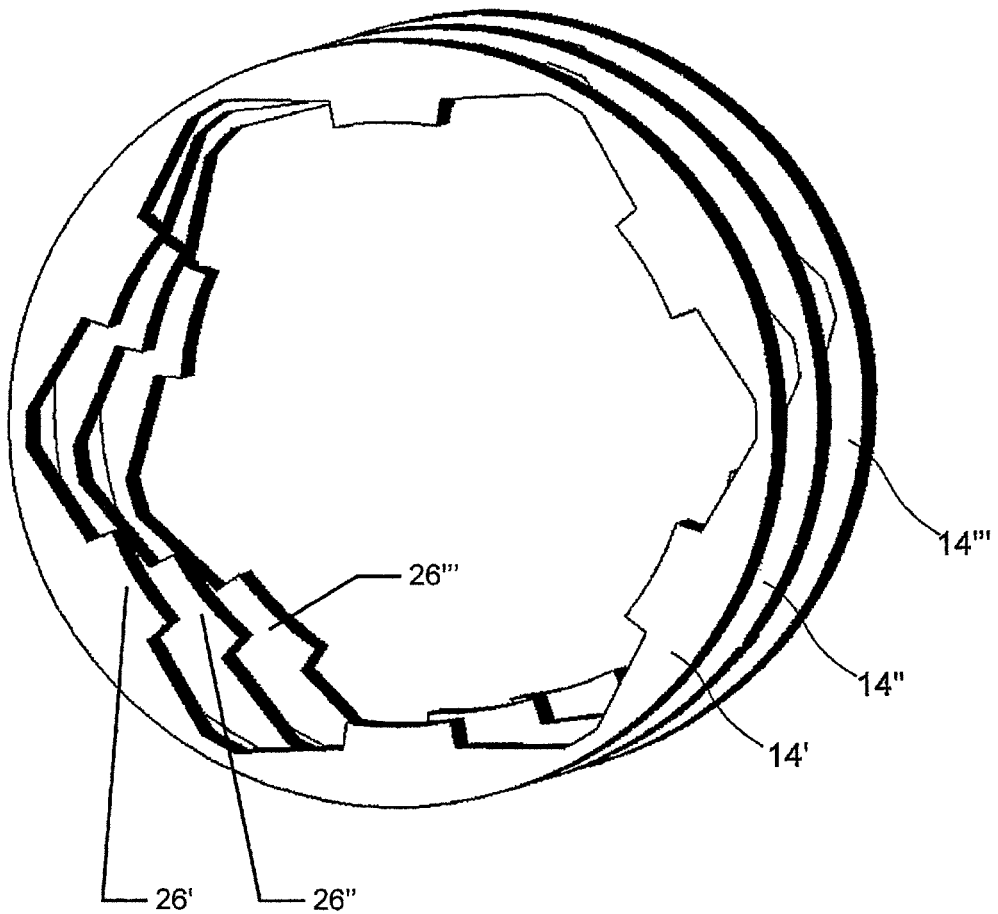
Figure 1D:
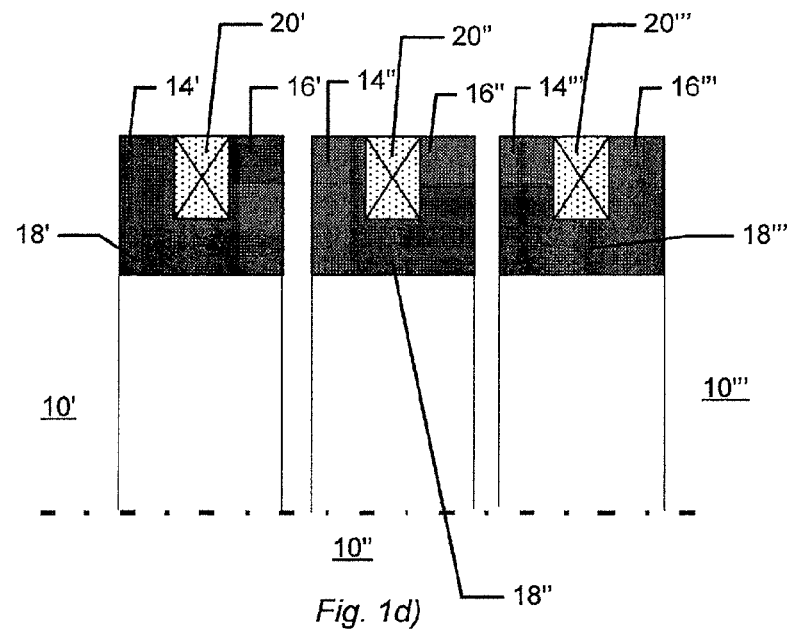

FIG. 1c) shows an example of spatial separation between phases according to prior art. In the figure the first stator core section 14', 14", 14''' of each phase is shown. The spatial separation in this example relates to the teeth 26 of the stator core section of one phase being circumferentially displaced in relation to the teeth of the stator core section of the other phases The schematic example of a stator device with separated phases in FIG. 1d) shows three separated phases, phase 1 of stator assembly 10', phase 2 of stator assembly 10", and phase 3 of stator assembly 10'''.

Each basic unit or phase unit comprises a single coil or core 20, a first stator core section 14, a second stator core section 16, and a stator yoke section 18. This phase unit creates a unidirectional but pulsing torque.

Figure 2:
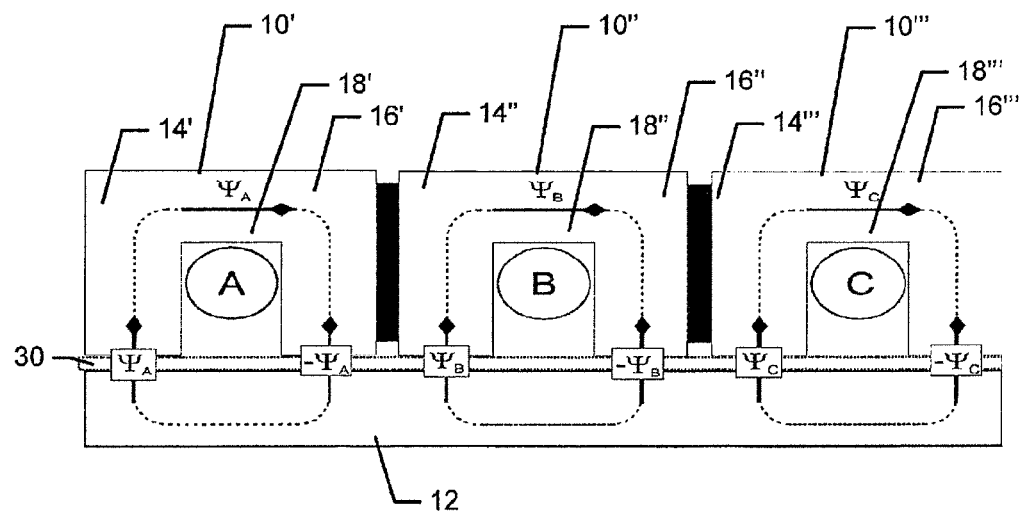
FIG. 2 shows an example of a cross-section of three-phase machine with separate phases.

FIG. 2 shows a cross-section of a three-phase Separate Phase Modulated Pole Machine (SPMPM). Phase 1 is indicated by A, stator core section 14' and stator assembly 10', phase 2 is indicated by B, stator core section 14" and stator assembly 10", and phase 3 is indicated by C, stator core section 14''' and stator assembly 10'''. The first stator core section 14, the second stator core section 16, and the stator yoke section 18 is shown for each phase unit.

The rotor 12 is seen, and the air gap 30 between the rotor and each of the stator assemblies, 10', 10", 10''', is seen. The magnetic flux, $\psi$, path for each of the phases are seen, $\psi_A$ for phase A, $\psi_B$ for phase B, and $\psi_C$ for phase C. The value of the separate fluxes, + or −, at the air gap 30 is also shown.

Figure 3:
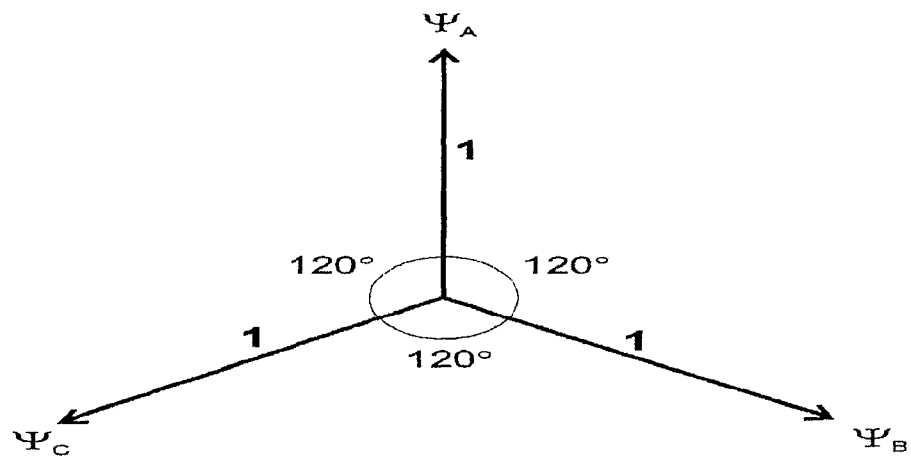
FIG. 3 shows an example of a magnetic flux phasor diagram of a three-phase machine with separate phases

FIG. 3 shows a magnetic flux phasor diagram for the separated phase units. The displacement of the phase units is 120°. The magnetic flux of phase 1 is indicated by $\psi_A$, the magnetic flux of phase 2 is indicated by $\psi_B$, and the magnetic flux of phase 3 is indicated by $\psi_C$.

Figure 4:
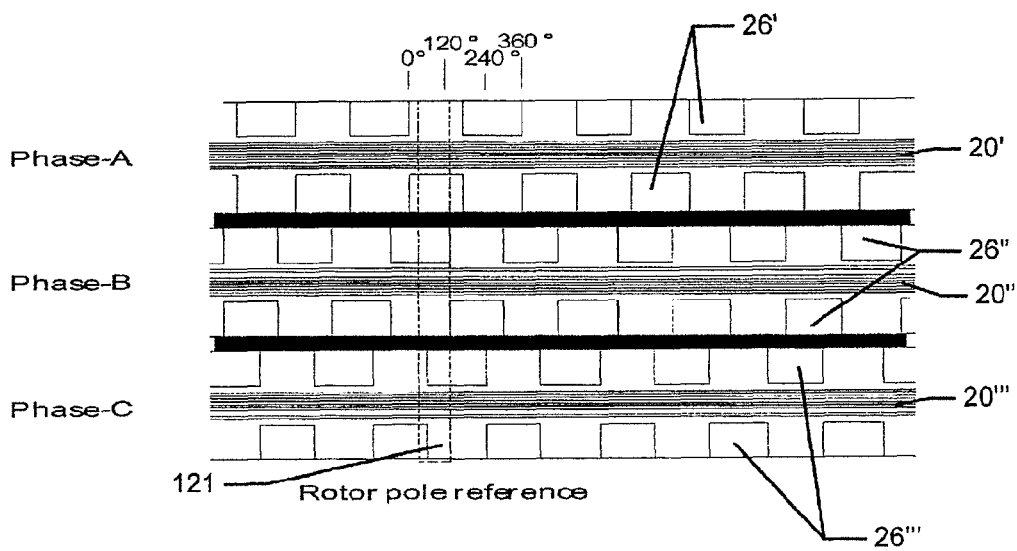
FIG. 4 shows an example of a stator arrangement of a three-phase machine with separate phases showing a stator from the normal direction of the air gap plane.

FIG. 4 shows an example of the displacement of phase units, phase A, phase B and phase C relative to the rotor pole. The rotor pole reference is indicated by the dotted rectangle 121 across phase A, phase B and phase C. The teeth 26 and the coils 20 of the phase units are shown. The teeth 26 are part of the stator core sections, as seen in FIG. 1b). The displacements of 120° between the phase units are seen and indicated by the position of the numbers 0°, 120°, 240° and 360°.

Each of these phase units has two sets of armature teeth 26, as seen in FIG. 1b), where the first stator core section 14 includes one set of teeth and the second stator core section 16 includes the other set of teeth. One set emanates from the left side of the coil 20 and has a north pole when driven with a certain direction of armature current, the other set emanates from the right side of the coil 20 and has a south pole when driven by the same direction of current.

When multiple phase units are used they are separated from each other axially, and this means that the teeth on the right side of the leftmost unit are in close proximity with the teeth of the left side of the next phase unit and so on for each of the units with facing sides.

However, this close proximity is not beneficial for the most obvious choices of angle displacement of the teeth.

FIGS. 5-9 show examples of a three-phase machine with combined phases, which may be termed the Combined Phase Modulated Pole Machine (CPMPM).

Figure 5:
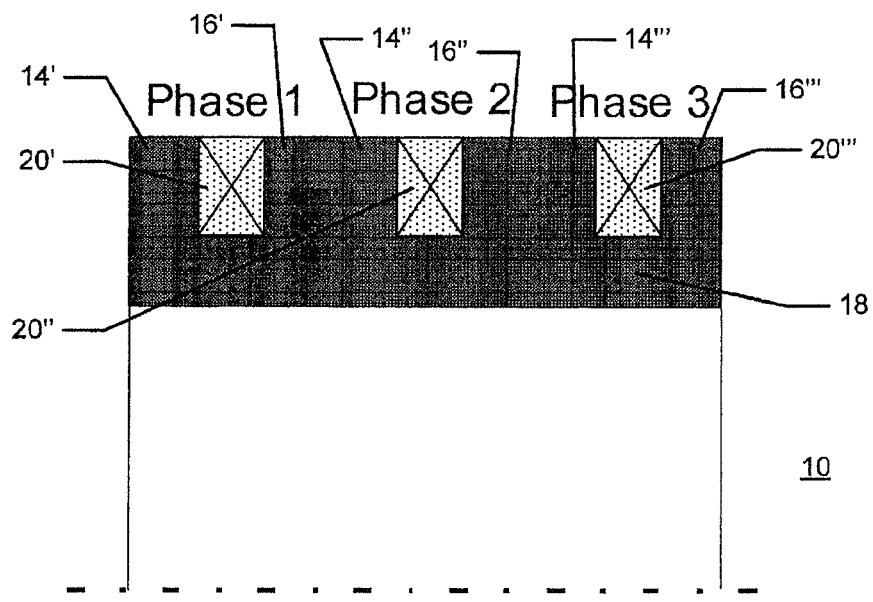
FIG. 5 shows an example of a stator device with magnetically combined phases.
Figure 6:
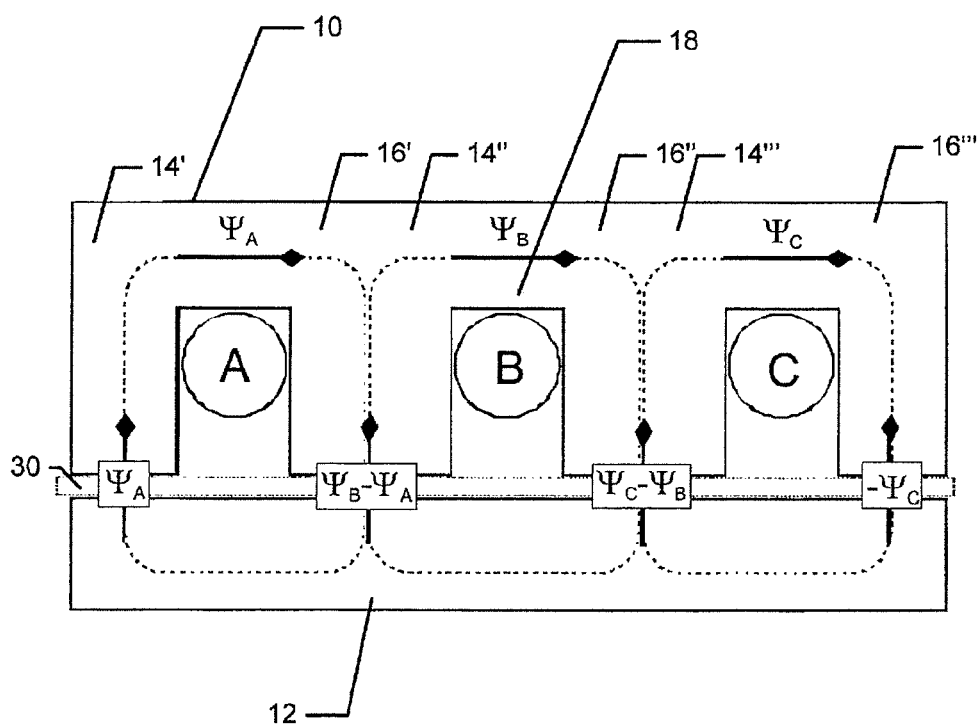
FIG. 6 shows an example of a cross-section of a three-phase machine with magnetically combined phases.
Figure 8:
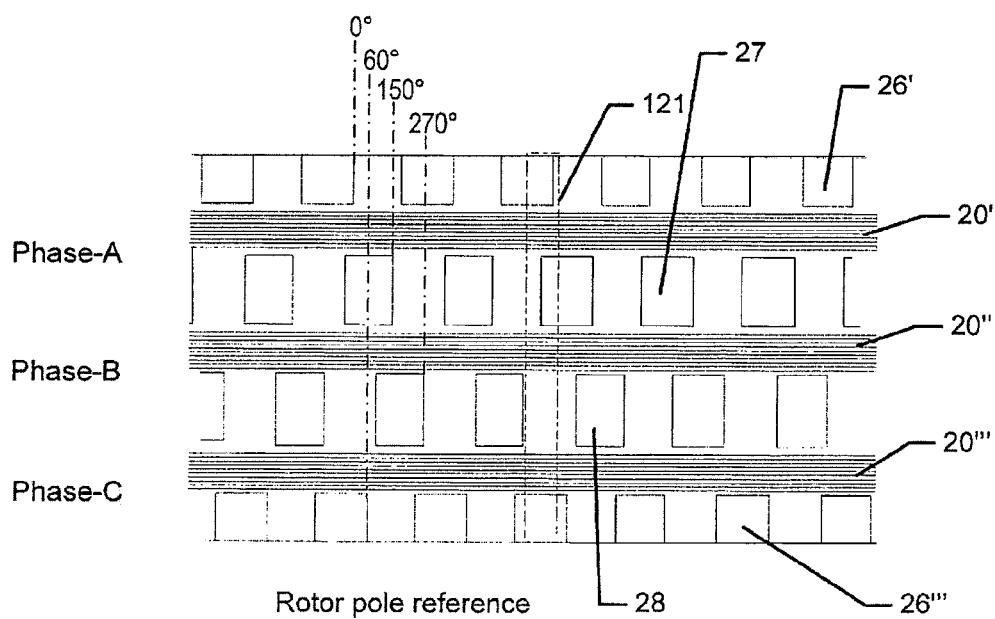
FIG. 8 shows an example of a stator arrangement of a three-phase machine with magnetically combined phases showing a stator from the normal direction of the air gap plane.

The combined phase machine comprises a stator assembly 10 as seen in FIG. 5 and FIG. 6, and a moving device 12, e.g. a rotor, as seen in FIG. 6. In FIGS. 5, 6 and 8, the reference numerals with ' refers to a feature of a first phase, " to a feature of a second phase and ''' to a feature of a third phase.

FIG. 5 shows that the stator assembly 10 comprises three phases, phase 1, phase 2 and phase 3. Phase 1 and phase 3 may be designated as peripheral phases and phase 2 may be designated an inner phase. Each phase comprises a single coil or core 20, which may be supplied with different voltages for operation, e.g. sinusoidal or square wave. Each phase furthermore comprises a first stator core section 14, and a second stator core section 16. As is seen in the figure, the first stator core section 14" of phase 2 and the second stator core section 16' of phase 1 are formed as a single unit. Similarly, the first stator core section 14''' of phase 3 and the second stator core section 16" of phase 2 are formed as a single unit. Furthermore, the first stator core section 14' of phase 1 is a single unit that is not shared with any other phase, and likewise the second stator core section 16''' of phase 3 is a single unit. Thus there are four single units, where two of the single units each are shared between two different phases.

The stator assembly 10 comprises a stator yoke section 18, which is common for and shared by all the phases. The stator yoke section is arranged to provide a magnetic flux path between stator core sections, thereby acting as a flux bridge. The material used for the stator yoke section may be soft magnetic powder in order to facilitate the assembly of the stator and to provide a relatively low reluctance transition between a first and a second stator core section.

A moving device is not shown in FIG. 5, but a moving device would be configured to be arranged at the top of the figure, so that the moving device is close to the coils 20.

FIG. 6 shows a cross-section of the three-phase Combined Phase Modulated Pole Machine (CPMPM). The stator assembly 10 comprises phase 1 indicated by A, phase 2 indicated by B, and phase 3 indicated by C. The first stator core section 14 and the second stator core section 16 are shown for each phase unit. The stator yoke section 18 is shared by and common for the three phases.

A moving device 12, which may be a rotor or mover, is shown, and the moving device comprises sections of permanent magnets and pole sections (not shown), which may be made from soft magnetic material. The pole sections are arranged between the permanent magnets, thereby separating the permanent magnets from each other. More about pole sections, permanent magnets and flux is described in WO2007/024184.

If the moving device 12 is a rotor, the rotor 12 may be arranged on an axle or shaft (not shown), and positioned in the center of the stator assembly 10 or, if the rotor is an outer rotor type, around the stator assembly. If the moving device 12 is a mover, the device may be a flat, linear device which does not have any inside or outside as the rotor, instead the mover moves just up and down or right or left.

An air gap 30 between the common stator assembly 10 and the moving device 12 is also shown in FIG. 6.

The moving device 12, e.g. the rotor, is arranged for interaction with all three phase sections, i.e. the rotor may extend in the axial direction in order to interact with all three phase sections. The electrical machine may comprise radial phase sections or axial phase sections or a combination.

Each of the stator core sections, 14', 16', 14", 16", 14''' and 16''', may be essentially circular in shape and include a plurality of radially extending teeth as seen in FIG. 8. The teeth are arranged to extend towards the moving device 12, e.g. the rotor, for forming a closed circuit flux path with the rotor 12. The teeth may extend inwards towards an inner rotor, or the rotor may be arranged outside the stator core sections, 14, 16, whereby the teeth should be arranged to extend radially outwards instead.

The magnetic flux ψ path for each of the phases are seen, $\psi_A$ for phase A, $\psi_B$ for phase B, and $\psi_C$ for phase C. The values of the combined fluxes at the air gap 30 are also shown.

The first 14 and second 16 stator core sections may be axially displaced in relation to each other and they may be arranged around a common axis. Each coil 20 may be arranged between the first 14 and the second 16 stator core section. The advantage of arranging the coil 20 like this is that all of the MMF (Magneto Motive Force) is seen by every pole and, thus, results in high electric loading and high output for given size and/or cost. The stator yoke section 18 may be arranged concentrically to the first 14 and the second 16 stator core sections. The stator yoke section 18 may be substantially of a width, in the axial direction, corresponding to the width of the assembly of the first 14 and the second 16 stator core sections and the coil 20, in order to be arranged as a flux bridge between the first 14 and the second 16 stator core section. By making the stator yoke section 18 from soft magnetic powder, the efficiency of the three dimensional flux path going from the first 14 and the second 16 stator core sections to the stator yoke section 18 is increased in relation to an embodiment where the stator yoke section is made from laminates. Further, one of the first 14 and the second 16 stator core sections may be rotationally displaced in relation to the other of the first 14 and the second 16 stator core section. This displacement results in that the teeth, see FIG. 8, of one of the first 14 and the second 16 stator core sections are positioned at a circumferential position different from the circumferential position of the teeth of the other of the first 14 or the second 16 stator core section. Each tooth of one of the first 14 or the second 16 stator core sections may be positioned, in the circumferential direction, in the middle of the gap between two teeth of the other of the first 14 or the second 16 stator core section.

The concept of displacing the teeth of one of the first 14 or the second 16 stator core section in relation to the teeth of the other stator core section is advantageous in order to make effective use of the above described and most effective design of the moving device.

FIG. 8 shows the displacement of the combined phase units, phase A, phase B and phase C relative to the moving device pole, e.g. the rotor pole. The rotor pole reference 121 is indicated by the dotted rectangle across phase A, phase B and phase C. The coil 20 of each of the phase units is shown. Each phase, A, B, C, comprises a first stator core section (not shown), and a second stator core section (not shown), and the stator core sections comprise teeth. As was seen in FIG. 5, the first stator core section 14" of phase 2, which corresponds to phase B here, and the second stator core section 16' of phase 1, which corresponds to phase A here, are formed as a single unit. Thus the teeth 27 are shared by phase A and B. Similarly, the first stator core section 14''' of phase 3, which corresponds to phase C here, and the second stator core section 16" of phase 2, corresponding to phase B here, are formed as a single unit, and therefore the teeth 28 are shared by phase B and C. Furthermore, the first stator core section 14' of phase 1, corresponding to phase A here, is a single unit, and the teeth 26' are not shared by two phases. Likewise the second stator core section 16''' of phase 3, corresponding to phase C here, is a single unit, and the teeth 26''' are not shared by two phases. Thus there are four single units, where two of the single units each are shared by two different phases, whereby each of the set of teeth 27 and 28 are shared by two different phases.

The displacements between the phases are seen and indicated by the position of the numbers 0°, 150°, 270°, and 60°, respectively, which are described in more detail below.

Thus one single set of teeth may be used to share sequential phases instead of using separate phase units. The selection of the appropriate orientation of each set of teeth can provide a significant benefit. If for example, a three phase machine with three coils arranged axially is provided, this gives four sets of teeth, one at either end, and one set between phases 1 and 2 and another set between phases 2 and 3, see FIG. 8. The choice of angle is not intuitive, but should be close to 0°, 150°, 270° and 60° for each of the four teeth sets taken from one end to the other.

According to some embodiments, the middle sets of teeth have a different axial width than the sets of teeth at the ends, as seen in FIG. 8, which provide a slight adjustment in axial width to make a truly balanced set of flux linkages and torques between the three phases.

Figure 9:
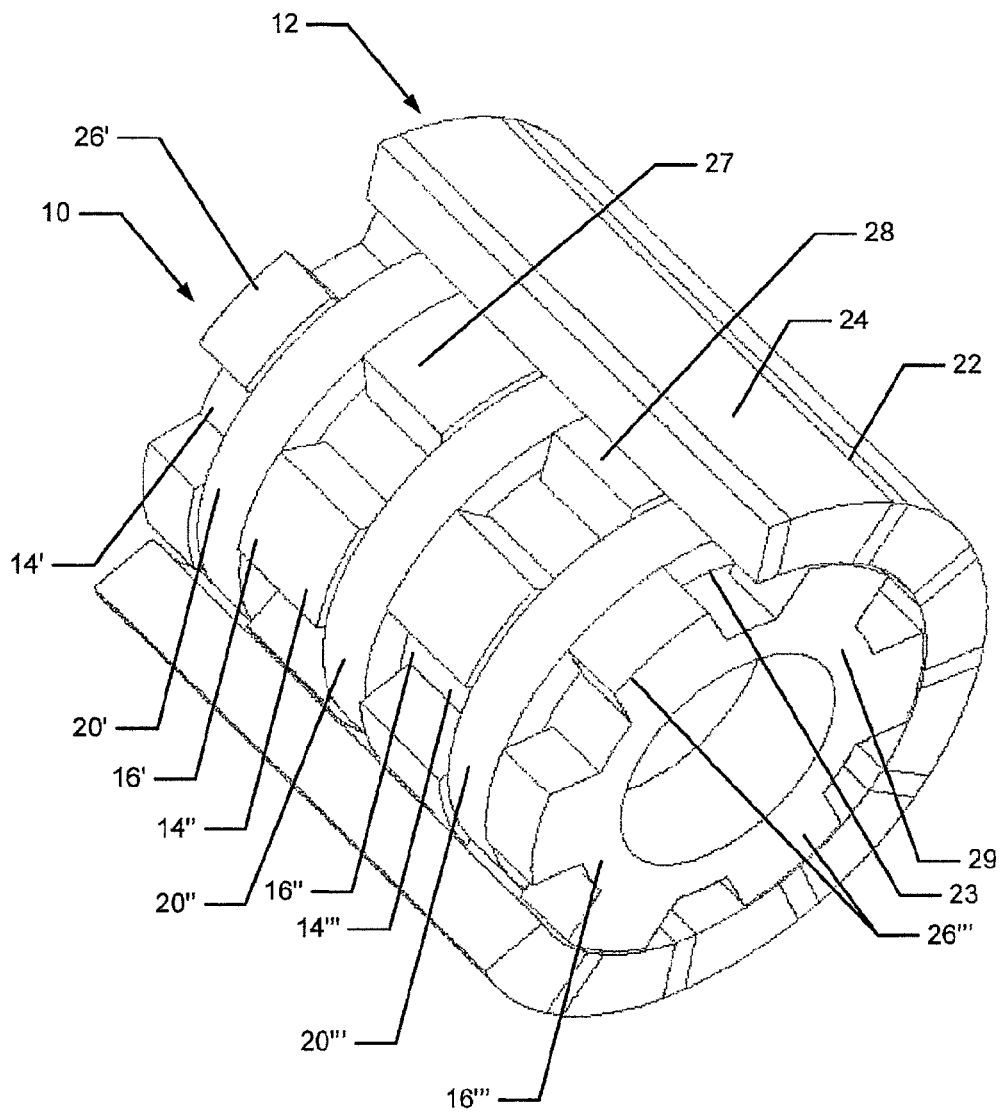
FIG. 9 shows an example of the structure of a three-phase machine with magnetically combined phases.

An example of the structure of a three-phase rotating machine with combined phases is shown in FIG. 9.

FIG. 9 shows a stator device 10 and a moving device 12 in the form of a rotor. The reference numerals with ' refer to a feature of a first phase, " to a feature of a second phase and ''' to a feature of a third phase. The stator device 10 comprises three phases, where each phase comprises a coil 20, a first stator core section 14 and a second stator core section 16. One rotor 12 is shown which encloses the stator device 10. The rotor 12 comprises permanent magnets 22 and pole sections 24 extending along the entire stator device 10. An axle onto which the stator is mounted may be provided (not shown). Each stator core section 14, 16 is essentially circular in shape and includes a stator core back section 29 and a plurality of radially extending teeth which extend from the stator core back section. The teeth are arranged to extend outwards towards the rotor 12 for forming a closed circuit flux path with the rotor 12. The stator core back section 29 connects the teeth in the circumferential direction. The stator cores sections further comprise a yoke section 23 extending axially from the stator core back section 29 towards the neighboring stator core section so as to provide an axial flux bridge.

The second stator core section 16' of phase 1 and the first stator core section 14" of phase 2 are arranged as one unit, i.e. a combined stator core section, whereby phase 1 and phase 2 share a stator core section. Thus the teeth 27 of the combined phase unit are arranged to be shared between phase 1 and phase 2, whereby the set of teeth of the first stator section 14" of phase 2 and the set of teeth of the second stator core section 16' of phase 1 are formed as one unit.

The teeth 28 of the combined phase unit are arranged to be shared between phase 2 and phase 3, whereby the set of teeth of the first stator section 14''' of phase 3 and the set of teeth of the second stator core section 16" of phase 2 are formed as one unit.

The teeth 26 at each end of the stator device 10 are not shared between two phases, and thus the teeth 26' belong only to phase 1 and the teeth 26''' belongs only to phase 3. Furthermore, the teeth 26' and 26''' of the peripheral phases 1 and 3 define the axial extent of the active air gap region of the stator which axially extends between the peripheral edges of the teeth 26' and 26", respectively. The permanent magnets 22 and pole sections 24 extend axially across the entire active air gap region, i.e. between the axially outer edges of the surfaces of teeth 26' and 26''' facing the rotor.

Figure 10A:
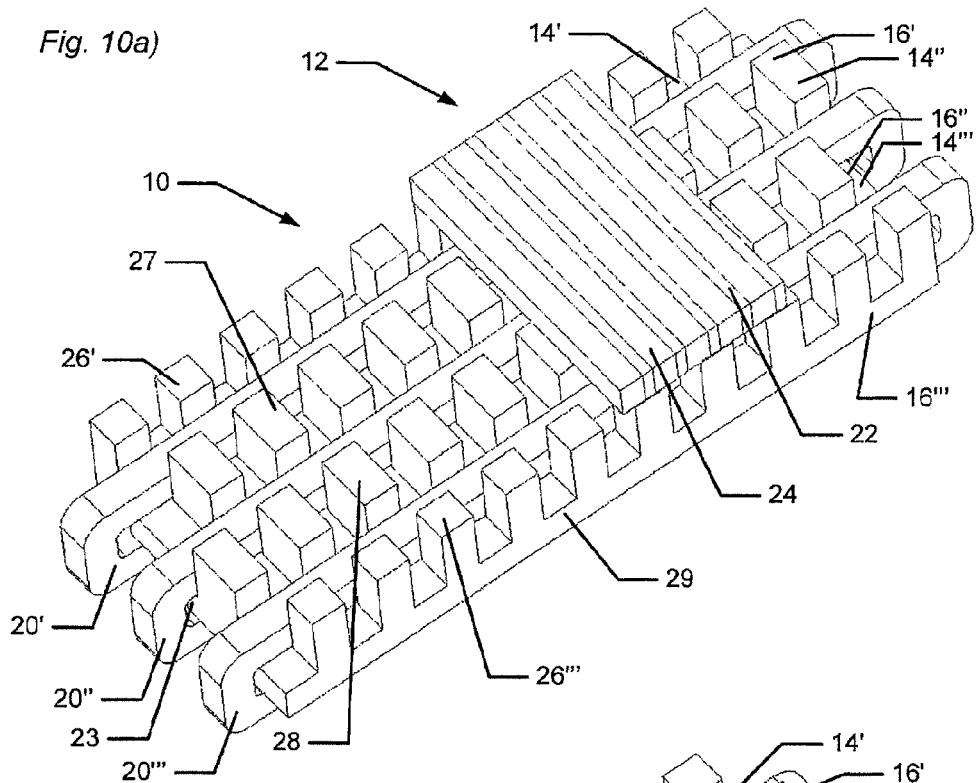
FIGS. 10a and 10b show examples of the structure of a three-phase linearly moving machine.
Figure 10B:
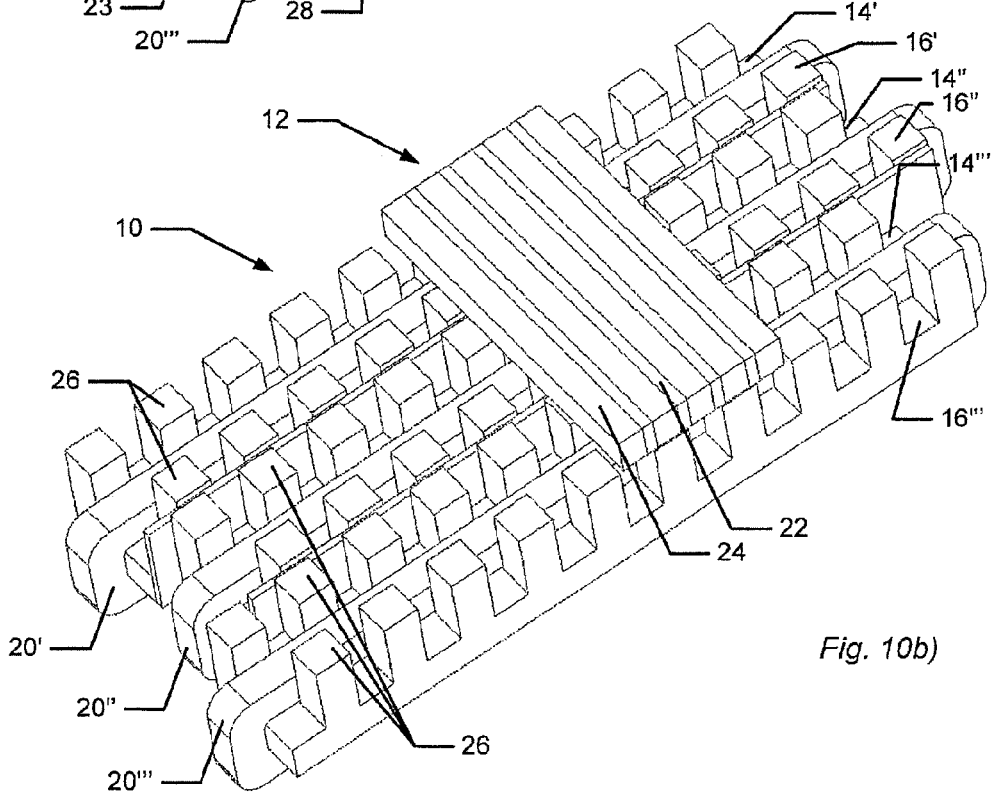

An example of the structure of a three-phase linearly moving machine with combined phases is shown in FIG. 10a). FIG. 10b) shows a linearly moving machine FIG. 10a) shows a stator device 10 and a moving device 12 in the form of a mover adapted to move linearly or transversally along the stator device. The reference numerals with ' refer to a feature of a first phase, " to a feature of a second phase and '" to a feature of a third phase. The stator device 10 comprises three phases, where each phase comprises a coil 20, a first stator core section 14 and a second stator core section 16. The mover 12 comprises permanent magnets 22 and pole sections 24 extending along the entire stator device 10. Each stator core section 14, 16 is essentially linear in shape and includes a plurality of linearly extending teeth. The teeth are arranged to extend towards the mover 12 for forming a closed circuit flux path with the mover 12.

The second stator core section 16' of phase 1 and the first stator core section 14" of phase 2 are arranged as one unit, i.e. a combined stator core section, whereby phase 1 and phase 2 share a stator core section. Thus the teeth 27 of the combined phase unit are arranged to be shared between phase 1 and phase 2, whereby the set of teeth of the first stator section 14" of phase 2 and the set of teeth of the second stator core section 16' of phase 1 are formed as one unit.

The teeth 28 of the combined phase unit are arranged to be shared between phase 2 and phase 3, whereby the set of teeth of the first stator section 14'" of phase 3 and the set of teeth of the second stator core section 16" of phase 2 are formed as one unit.

The sets of teeth 26 at each of the two ends of the stator device 10 are not shared between two phases, and thus the teeth 26' belong only to phase 1 and the teeth 26'" belongs only to phase 3.

In FIG. 10b) all the three phases are separated, and thus first 14 and second 16 stator core sections are not shared between any phases. Thus there are only sets of separate teeth 26, i.e. teeth belonging to only one phase, in the machine of FIG. 10b).

Figure 11A:
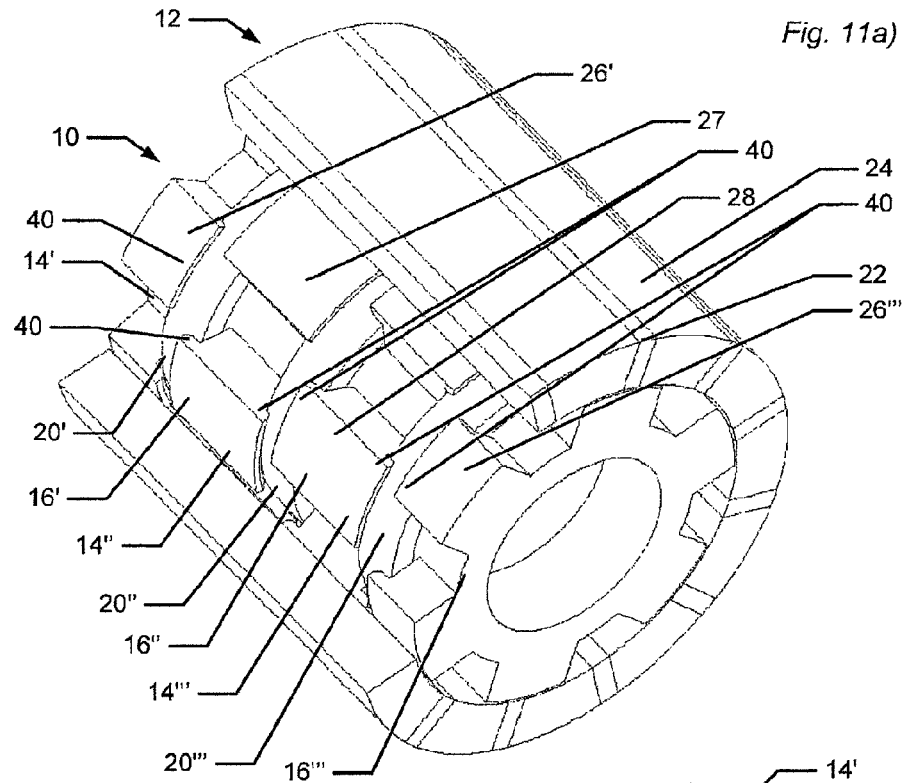
FIGS. 11a and 11b show examples of the structure of three-phase machines with magnetically combined phases and semi-claw poles.
Figure 11B:
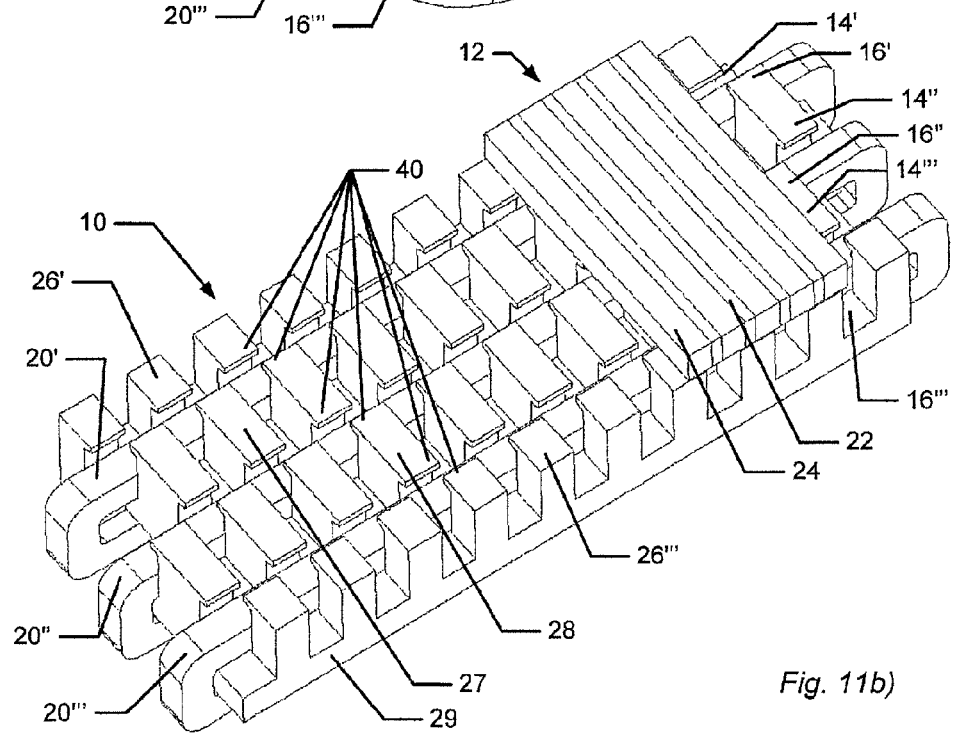

Examples of the structure of three-phase machines with combined phases and semi-claw poles are shown in FIGS. 11a and 11b.

FIGS. 11a) and 11b) show a stator device 10 and a moving device 12. In FIG. 11a) the moving device 12 is a rotor, which is shown enclosing the stator device 10, and in FIG. 11b) the moving device 12 is a mover adapted to move linearly or transversally along the stator device. The reference numerals with ' refer to a feature of a first phase, " to a feature of a second phase and '" to a feature of a third phase. The stator device 10 comprises three phases, where each phase comprises a coil 20, a first stator core section 14 and a second stator core section 16. The moving device 12 comprises permanent magnets 22 and pole sections 24 extending along the entire stator device 10. Each stator core section 14, 16 includes a plurality of extending teeth. The teeth are arranged to extend towards the moving device 12 for forming a closed circuit flux path with the moving device 12. The second stator core section 16' of phase 1 and the first stator core section 14" of phase 2 are arranged as one unit, i.e. a combined stator core section, whereby phase 1 and phase 2 share a stator core section. Thus the teeth 27 of the combined phase unit are arranged to be shared between phase 1 and phase 2, whereby the set of teeth of the first stator section 14" of phase 2 and the set of teeth of the second stator core section 16' of phase 1 are formed as one unit.

The set of teeth 28 of the combined phase unit are arranged to be shared between phase 2 and phase 3, whereby the set of teeth of the first stator core section 14'" of phase 3 and the set of teeth of the second stator core section 16" of phase 2 are formed as one unit. The set of teeth 26 at each end of the stator device 10 are not shared between two phases, and thus the set of teeth 26' belongs only to phase 1 and the teeth 26'" belongs only to phase 3.

Furthermore, the combined phases machines of FIGS. 11a) and 11b) comprise semi-claw poles 40, which are short extensions of the teeth in the set of teeth 26', 27, 28 and 26'" that overlap the coils 20. The semi-claw poles are short, small or minor claw poles, i.e. claw poles which do not extend along the entire axial width of a phase, but which only extend along a small part of the axial width, whereby magnetic leakage is avoided or reduced. FIGS. 11a) and 11b) show that the semi-claw poles 40 are arranged integrated with the teeth. The sets of teeth 27 and 28 which are each shared between two phases comprise the semi-claw poles in both ends of the teeth, i.e. adjacent to coils 20, whereas the sets of teeth 26' and 26'", which are not shared between two phases but only belongs to one phase, only comprise the semi-claw poles in the end of the teeth adjacent to the respective coils 20' and 20'".

An improvement of 30% in torque compared to prior art machines can be realized, when using the same magnets, same stator magneto motive force, same bore and same air gap width.

A larger and smoother torque can be created when employing multiple phase units which are mechanically and electrically displaced in angular position, instead of employing only one phase. For instance, a three phase machine can have the phase units mechanically displaced by $\frac{1}{3}^{rd}$ of the pitch of a pair of poles, or 120 degrees electrical angle and the phase currents separated by the same angle in time, while using a single moving device structure, e.g. a rotor structure, extending through or around the three stators.

A similar effect can be gained using three stator units all aligned in circumferential position but supplied with currents which are 120 degree in time apart to act in combination with three moving device sections, e.g. rotor sections, one for each phase which are displaced 120 degrees apart circumferentially.

As mentioned, a prior art Separate three-Phase Modulated Pole Machine has three phases with a 120° displacement between each phase as seen in FIG. 3. Each phase consists of two sets of teeth, displaced by 180°, forming a set of north poles and a set of south poles. The three phase machine consists of six sets of teeth (in three pairs) plus three coils. Each phase is separated from the adjacent phase by a small distance or air gap, see FIG. 2, to ensure minimal magnetic coupling between phases.

When the phase are combined instead of being separated, as seen in FIGS. 5, 6 and 8, adjacent teeth now have a shared flux path, as seen in FIG. 6. Merging adjacent teeth may result in a machine with four sets of teeth and three coils, see FIG. 8, and with a common moving device, e.g. rotor, stretching the full axial width of the machine.

Figure 7:
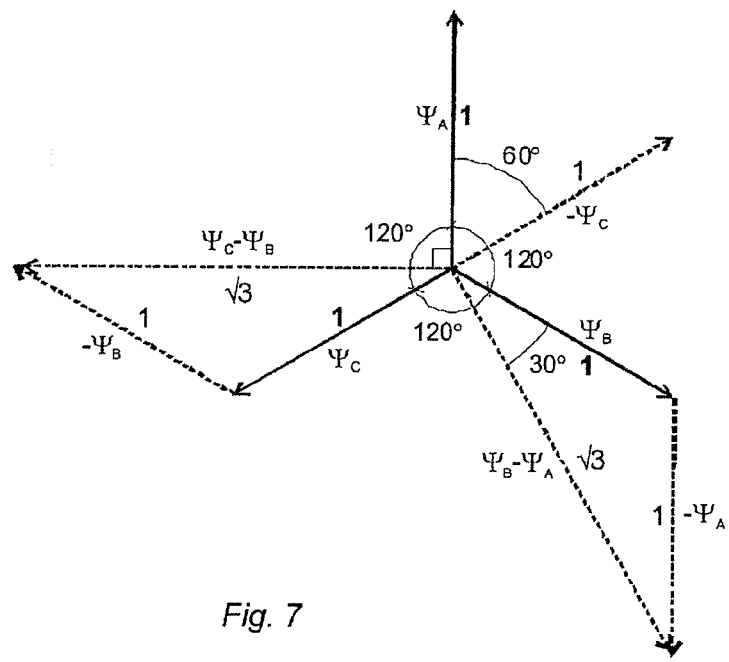
FIG. 7 shows an example of a magnetic flux phasor diagram of a three-phase machine with magnetically combined phases.

Each set of teeth should be positioned at a certain angle, and gather a certain amount of flux to ensure a balanced three phase operation, where each coil links flux of an equal magnitude and at a phase angle of 0°, 120° and 240° respectively, see FIG. 7.

To calculate the conditions for which a balanced three phase set of coil fluxes result, the Combined Phase Modulated Pole Machine is analyzed with the following assumptions:
the air gap flux density is constant in the axial direction and varies sinusoidally in the circumferential direction;
flux entering a tooth, $\psi=ba$, where b is the air gap flux density and a is the air gap surface area of the tooth;
the angular position of the tooth (circumferentially) determines the phase angle of the flux entering the tooth;

the flux traversing in the axial direction through the coreback directly over a coil is equal to the flux linking the coil.

In the following, reference is made to the phasor diagrams in FIGS. 3 and 7.

A balanced three phase machine has the following coil flux linkages:

$$\psi A = |\psi| < 0°$$

$$\psi B = |\psi| < 120°$$

$$\psi C = |\psi| < 240°$$

The teeth are numbered 1, 2, 3, 4 in the axial direction, summing the flux entering each tooth:

$$\psi 1 = \psi A$$

$$\psi 2 = \psi B - \psi A$$

$$\psi 3 = \psi C - \psi B$$

$$\psi 4 = -\psi C$$

Relating the tooth flux to the required balanced three coil fluxes, as shown in the phasor diagram in FIG. 7, results in the following tooth fluxes:

$$\psi 1 = |\psi| < 0°$$

$$\psi 2 = |\sqrt{3}\psi| < 150°$$

$$\psi 3 = |\sqrt{3}\psi| < 270°$$

$$\psi 4 = |\psi| < 60°$$

Therefore for a balanced three phase machine, the teeth (1, 2, 3, 4) may be positioned at a phase angle of 0°, 150°, 270°, 60°, where a phase angle of 360° corresponds to the circumferential pitch distance between neighboring teeth, Hence, the angular displacement of the teeth relative to one of the sets of teeth is 0°/N, 150°/N, 270°/N, 60°/N, where N is the number of teeth in each set of teeth. Furthermore, a correct surface area may be ensured when the relative axial widths of the teeth in the respective sets of teeth are: 1, √3, √3 and 1, respectively. Hence, the inner teeth that are shared between two neighboring phases are wider by a factor of √3 than the peripheral teeth that are not shared between phases but only belong to a single phase.

FIG. 7 shows a magnetic flux phasor diagram for the combined phases, where the angles are shown, as well as the axial width of 1 unit, √3 units, √3 units and 1 unit, respectively. The magnetic fluxes of the combined phases are also seen.

Figure 12:
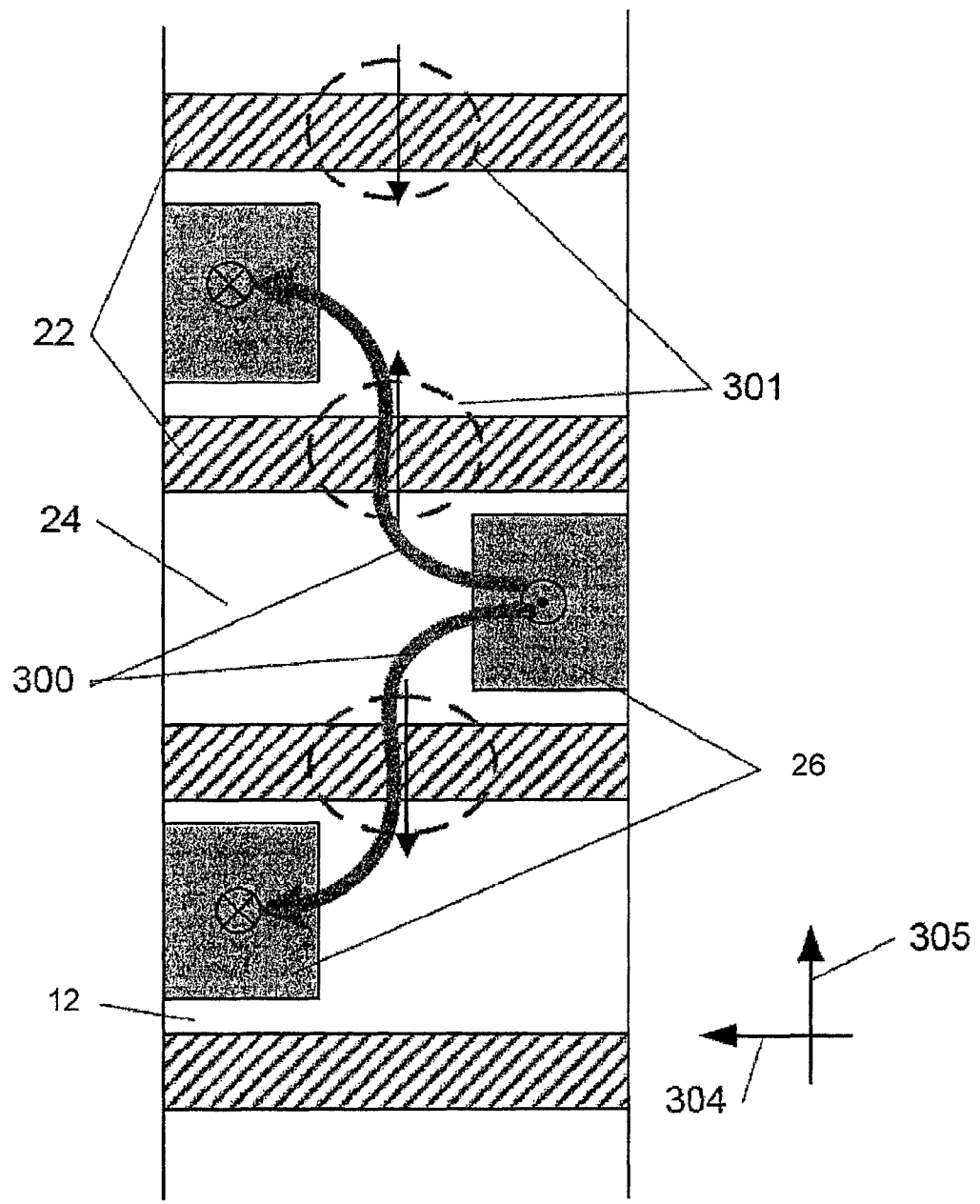
FIG. 12 shows an example of flux paths in the stator device and in the moving device.

FIG. 12 shows an example of flux paths in the stator device and in the moving device. The modulated pole machine has a three-dimensional (3D) flux path utilizing magnetic flux paths in the 'axial' transverse direction both in the stator and in the moving device, e.g. rotor.

In FIG. 12 a moving device 12, e.g. a rotor, is seen from radial outward position relative to the stator device 10 of which three teeth 26 are outlined. The axial 304 and tangential 305 directions of the moving device/stator device are depicted. A number of the permanent magnets 22 in the moving device are shown as hatched areas with the pole sections 24 in between. In the sketch the stator teeth 26 are in the situation of being just opposite a pole section 24 yielding the main magnetic flux path 300 as shown by the thick lines. As can be seen the flux direction through the permanent magnets 22 are primarily 2-dimensional whereas the flux through the pole sections 24 is 3-dimensional. Furthermore, the magnetic flux is concentrated primarily in the central regions 301 of each permanent magnet 22 between two neighboring pole sections. This design of the moving device 12 thus enables flux concentration from the permanent magnets so that the surface of the moving device 12 facing a stator tooth 26 may present the total magnetic flux from both of the neighboring permanent magnets to the surface of the tooth. The flux concentration may be seen as a function of the area of the permanent magnets facing each pole section divided by the area facing a tooth. These flux concentration properties of each pole section makes it possible to use weak low cost permanent magnets as permanent magnets in the moving device and makes it possible to achieve very high air gap flux densities. The flux concentration may be facilitated by the pole section being made from soft magnetic powder enabling effective three dimensional flux paths as illustrated.

Even though not shown in FIG. 12, there is a corresponding 3-dimensional flux path in the stator device.

As also seen in FIG. 8, the 3-dimensional flux path comprises the axial or transverse flux path of the moving device 12, where the flux path is transverse to the motion direction. The 3-dimensional flux paths in the stator device and in the moving device are particularly suitable when utilizing the combined phases stator.

Both a radial machine or an axial machine or a mix of axial and radial are possible.

In case of the axial flux version, the teeth areas which are facing the air gap may form concentric rows with the coils or windings in between these rows. So a three-phase version can be designed with three separate sets each of two concentric rows of teeth and a coil or winding with a distance to the nearest phase set to avoid magnetic coupling. Thus the axial, combined phase arrangement may combine two neighboring or adjacent rows of teeth in the same way as for the radial air gap flux version (see e.g. FIG. 8).

Generally, the stator structures described herein may be made of a soft magnetic powder, e.g. a substantially pure water atomized iron powder or a sponge iron powder having irregular shaped particles which have been coated with an electrical insulation. In this context the term "substantially pure" means that the powder should be substantially free from inclusions and that the amount of the impurities O, C and N should be kept at a minimum. The average particle sizes are generally below 300 μm and above 10 μm.

However, any soft magnetic metal powder or metal alloy powder may be used as long as the soft magnetic properties are sufficient and the powder is suitable for die compaction.

The electrical insulation of the powder particles may be made of an inorganic material. Especially suitable are the type of insulation disclosed in U.S. Pat. No. 6,348,265 (which is hereby incorporated by reference), which concerns particles of a base powder consisting of essentially pure iron having an insulating oxygen- and phosphorus-containing barrier. Powders having insulated particles are available as Somaloy®500, Somaloy®550 or Somaloy®700 available from Höganäs AB, Sweden.

Although some embodiments have been described and shown in detail, the invention is not restricted to them, but may also be embodied in other ways within the scope of the subject matter defined in the following claims. In particular, it is to be understood that other embodiments may be utilized and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. An electrical machine comprising a stator device and a moving device,
   wherein the stator device is a multi-phase stator device comprising a plurality of phases arranged side-by-side in a lateral direction, perpendicular to a direction of motion of the moving device, where the stator device comprises a plurality of sets of teeth, each tooth protruding towards the moving device and comprising an interface surface facing the moving device, wherein the teeth of each set are distributed along the direction of motion, wherein the plurality of sets of teeth comprises two peripheral sets and a plurality of inner sets arranged in the lateral direction between the peripheral sets; where the teeth of the inner sets are wider, in the lateral direction, than the teeth of the peripheral sets and provide a common magnetic flux path shared by two neighbouring phases; wherein the interface surfaces of the teeth of the peripheral sets define a lateral extent of an active air gap region between the stator device and the moving device;
   wherein the stator device comprises at least two separate stator core sections that abut each other and share one of the plurality of phases;
   wherein the moving device comprises a plurality of permanent magnets separated from each other in said direction of motion by pole sections formed as rectilinear rods elongated in the lateral direction, the rods providing a magnetic flux path extending across the lateral extent of the active air gap region; and
   wherein the teeth of the respective sets are arranged displaced in the direction of motion relative to the teeth of the other sets.

2. The electrical machine according to claim 1, wherein the stator device comprises a plurality of stator core sections, each stator core section comprising one of the sets of teeth.

3. The electrical machine according to claim 2, wherein the stator device comprises a plurality of windings arranged between respective stator core sections.

4. The electrical machine according to claim 2, wherein each stator core section comprises a stator core back section and a set of teeth extending from the stator core section, wherein the stator core back section connects the teeth and provides a flux path between neighboring teeth in the direction of motion.

5. The electrical machine according to claim 4, wherein each stator core section further comprises a yoke section that provides a flux path in the lateral direction towards another stator core section comprising another one of the sets of teeth of the same phase.

6. The electrical machine according to claim 1, wherein the stator core sections are made from soft magnetic powder.

7. The electrical machine according to claim 1, comprising a number n of phases, including two peripheral phases each having a single neighbouring phase, and n−2 inner phases each having two neighbouring phases; wherein each inner phase comprises two common sets of teeth, each common set of teeth being magnetically shared with one of the respective neighbouring phases of the inner phase, wherein each peripheral phase comprises a set of peripheral teeth and a set of common teeth, the common teeth being magnetically shared with the respective neighbouring phase of the peripheral phase, and wherein the common teeth have a width in a direction perpendicular to a direction of motion larger than the corresponding width of the peripheral teeth and smaller than twice the corresponding width of the peripheral teeth.

8. The electrical machine according to claim 1, wherein the stator device is a three-phase stator.

9. The electrical machine according to claim 1, wherein the electrical machine is a rotary machine, and wherein the moving device is a rotor.

10. The electrical machine according to claim 9, wherein the stator device is a three-phase stator and comprises four sets of teeth, each set comprising N teeth, N being an integer number larger than 1, and wherein the teeth of the respective sets of teeth are arranged circumferentially displaced at angles 0°/N, 150°/N, 270°/N, 60°/N relative to the teeth of a first one of the sets of teeth.

11. The electrical machine according to claim 1, wherein the stator device comprises four sets of teeth and lateral widths of the four sets of teeth are 1 unit, $\sqrt{3}$ units, $\sqrt{3}$ units, 1 unit, respectively.

12. The electrical machine according to claim 1, wherein the moving device is a mover arranged to move linearly in the direction of motion of the moving device.

13. The electrical machine according to claim 1, wherein the electrical machine is a modulated pole machine.

14. The electrical machine according to claim 1, wherein the stator device and/or the moving device provide a three-dimensional (3D) flux path including a flux path component in the transverse direction relative to the direction of motion.

15. The electrical machine according to claim 1, wherein each stator core section comprises a stator core back section that is continuous along the direction of motion of the moving device, and a set of teeth extending from the stator core back section.

16. A stator device adapted to be arranged in an electrical machine, where the electrical machine further comprises a moving device,
   where the stator device is a multi-phase stator device, where the phases are arranged side-by-side in a direction perpendicular to a direction of motion of the moving device, and where each phase comprises two stator core sections each having a respective set of teeth, a flux bridge connecting the stator core sections, and a coil, and where the teeth are arranged to protrude towards the moving device; and
   wherein the teeth of a first stator core section of a first one of two neighbouring phases and the corresponding teeth of a second stator core section of a second one of the two neighbouring phases provide a common magnetic flux path shared by both neighbouring phases; and
   wherein the stator device comprises at least two separate stator core sections that abut each other and share one of the plurality of phases.

17. The stator device according to claim 16, wherein the teeth of the first stator core section of the first one of the two neighbouring phases are located at the same positions in the direction perpendicular to the direction of motion of the moving device as the corresponding teeth of the second stator core section of the second one of the two neighbouring phases.

18. The stator device according to claim 16, wherein each stator core section is a soft magnetic structure.

19. The stator device according to claim 16, wherein the sets of teeth of the respective stator core sections of each phase are arranged displaced with respect to each other in the direction perpendicular to the direction of motion of the moving device by a respective displacement, and wherein at least two of the phases have different displacements.

20. The stator device according to claim 16, wherein the teeth of each stator core section have a respective width in the direction perpendicular to the direction of motion of the moving device, and where the teeth of a first stator core section have a width different from a width of the teeth of a second stator core section.

21. A stator device according to claim 16, wherein the first stator core section and the second stator core section are formed as a single unit comprising a set of common teeth common to the first and second stator core sections.

22. The stator device according to claim 16, comprising a number n of phases, including two peripheral phases each having a single neighbouring phase, and n−2 central phases each having two neighbouring phases; wherein each central phase comprises two common sets of teeth, each common set of teeth being magnetically shared with one of the respective neighbouring phases of the central phase, wherein each peripheral phase comprises a set of peripheral teeth and a set of common teeth, the common teeth being magnetically shared with the respective neighbouring phase of the peripheral phase, and wherein the common teeth have a width in a direction perpendicular to a direction of motion larger than the corresponding width of the peripheral teeth and smaller than twice the corresponding width of the peripheral teeth.

23. The stator device according to claim 16, wherein the stator device is a three-phase stator.

24. The stator device according to claim 23, wherein the stator device comprises four sets of teeth, each set comprising N teeth, N being an integer number larger than 1, and wherein the teeth of the respective sets of teeth are arranged circumferentially displaced at angles 0°/N, 150°/N, 270°/N, 60°/N relative to the teeth of a first one of the sets of teeth.

25. The stator device according to claim 23, wherein the stator device comprises four sets of teeth and axial widths of the four sets of teeth are 1 unit, $\sqrt{3}$ units, $\sqrt{3}$ units, 1 unit, respectively.

26. The stator device according to claim 16, wherein the electric machine is a rotary machine, and wherein the moving device is a rotor.

27. The stator device according to claim 16, wherein the moving device is a mover arranged to move linearly in the direction of motion of the moving device.

28. The stator device according to claim 27, wherein each stator core section is a soft magnetic structure.

29. The stator device according to claim 16, wherein the coil is arranged between the first and the second stator core sections.

30. The stator device according to claim 16, wherein the stator device and the moving device constitute a modulated pole machine.

31. The stator device according to claim 16, wherein the stator device and/or the moving device comprise a three-dimensional (3D) flux path including a flux path component in the transverse direction relative to the direction of movement.

32. The stator device according to claim 16, wherein each stator core section comprises a stator core back section that is continuous along the direction of motion of the moving device, and a set of teeth extending from the stator core back section.

* * * * *